3,027,360
POLYMERISATION PROCESS
Alaric Louis Jeffrey Raum, Teddington, England, assignor to The Distillers Company Limited, Edinburgh, Scotland, a British company
No Drawing. Filed Apr. 15, 1957, Ser. No. 652,670
Claims priority, application Great Britain May 1, 1956
16 Claims. (Cl. 260—93.7)

The present invention relates to the polymerization of α-olefins including ethylene to give linear polymers and copolymers having high average molecular weights.

Such α-olefins have previously been polymerised under mild conditions of temperature and pressure by using a polymerisation catalyst system obtained by mixing certain compounds of metals occurring in the (a) sub-groups of groups IV and VI of the periodic table with various compounds or non-transition metals occurring in the first four groups of the periodic table. The compounds added to the compounds of the metals occurring in the (a) sub-groups of groups IV to VI of the periodic table in order to form the catalyst system appear to act as reducing agents and will hereinafter be referred to as the reducing components of the catalyst systems.

The yield of polymer or copolymer obtained and the rate of polymerisation varies considerably with different catalyst systems. Catalyst systems with different activities and efficiencies are obtained when either of the two essential components of the system is altered.

An object of the present invention is the provision of an improved catalyst system and, thereby, of an improved process for the polymerisation of α-olefins.

According to the present invention, the process for the polymerisation of an α-olefin comprises contacting the olefin with a catalyst system formed by mixing a reducing component, as herein defined, with preformed, metastable titanium trichloride.

Any α-olefin can be polymerised according to the present invention. By the term α-olefin is meant any compound which can b represented by the formula

R—CH=CH$_2$ where R is hydrogen or an alkyl, cycloalkyl or aryl group. Examples are ethylene, propylene, 1-n-butene, 1-n-pentene, 1-n-hexene, and aromatic vinyl hydrocarbons such as for example styrene and its homologues. These olefins can be polymersed alone to form homopolymers, or as mixtures with each other to form valuable copolymers. Particularly useful results are obtained from the polymerisation of aliphatic α-olefins such for, example, as ethylene or propylene.

By the term "reducing component" is meant throughout this specification any compound of a non-transition metal occurring in the first four groups of the periodic table which is capable of forming a catalyst system for the polymerisation of α-olefins, for example ethylene or propylene, when mixed with a suitable compound of a metal occurring in the (a) sub-groups of groups IV to VI of the periodic table, for instance, titanium tetrachloride. This type of polymerisation is often known as "Zeigler" polymerisation after its discoverer Professor Ziegler. Ziegler type catalyst systems containing different reducing components are described in Belgian Patents 533,362, 534,888, 534,792, 538,782 and 534,941. Any of these reducing components can be used in the present invention.

The reducing components are compounds capable of acting as reducing agents under anhydrous conditions. The preferred compounds are organic compounds of the metals or hydrides or complexes obtained from such compounds. By an "organo compound" of the metal is meant a compound having at least one hydrocarbon radical attached to an atom of the non-transition metal, any remaining metal valencies being satisfied by hydrogen or halogen atoms. Suitable hydrocarbon radicals include alkyl, alkenyl, alkynyl, cyclo-alkyl, aryl and aralkyl radicals, of which alkyl is preferred. Other examples of organo-metallic compounds are the complexes formed from aluminium organo compounds and alkali metals, e.g., LiAl (C$_2$H$_5$)$_4$; NaAl (C$_3$H$_7$)$_4$; NaAl (C$_6$H$_5$)$_4$; NaAl (C$_2$H$_5$)$_3$H; LiAl (C$_3$H$_7$)H$_3$; and KAl (CH$_3$)$_3$F. Examples of reducing components not containing organic radicals are lithium aluminium hydride and lithium borohydride.

The reducing compounds of aluminium are particularly valuable reducing components for use in the process of the present invention. A wide range of such compounds can be represented by the formula R$_2$AlX where R is hydrogen or a hydrocarbon group and X is hydrogen, halogen, a hydrocarbon, alkoxy or aryloxy group or a radical derived from a secondary amine, from a secondary acid amide, from a mercaptan, from a thiophenol, from a carboxylic or sulphonic acid. Examples of such aluminium compounds are triethyl aluminium, tripropyl aluminium, triisobutyl aluminium, tridodecyl aluminium, aluminium hydride, ethyl aluminium dihydride, diethyl aluminium hydride, diethyl aluminium chloride, diisobutyl aluminium chloride, dibutyl aluminium fluoride, methoxy aluminium dimethyl, triphenyl aluminium, diethyl aluminium phenolate, diethyl aluminium piperidyl, dimethylamino aluminium diethyl and ethyl mercaptyl aluminium diethyl. The preferred reducing components are the aluminium trialkyls and the dialkyl aluminium halides.

In certain instances it is possible to form the reducing component in situ. For instance, polymerisation reactions according to the present invention can be initiated by using phenyl sodium or a mixture of sodium sand and chlorobenzene as the reducing component.

Examples of suitable organo-metallic compounds are the alkyl and aryl compounds of the metals lithium, sodium, magnesium, zinc, cadmium, aluminum, tin and lead. Specific compounds are tetraethyl lead, tetraethyl tin, diethyl cadmium, dibutyl zinc, dipropyl zinc, diethyl zinc, dimethyl zinc, dibutyl magnesium, dimethyl magnesium, sodium phenyl, sodium n-butyl, lithium phenyl and lithium n-butyl. Examples of organo-metallic compounds containing halogen atoms are Grignard compounds and the corresponding compounds of zinc, calcium and barium, e.g., phenyl magnesium bromide, propyl or butyl magnesium chloride, phenyl calcium iodide and phenyl barium iodide.

The metastable titanium trichloride must be preformed before it is mixed with the reducing component in order to form an improved polymerisation system of the present invention, i.e., the metastable titanium trichloride should not be formed in the presence of the reducing component. In this way a maximum yield of the polymerised olefin, polymer or copolymer is obtained from a given amount of reducing component and high polymerisation rates are obtained.

Titanium trichloride as normally prepared is in the form of black or violet crystals. This form of titanium trichloride is well known and is not directly convertible to the metastable form which is used in the process of the present invention. Metastable titanium trichloride is brown in colour and can be irreversibly converted to the black or violet stable form by the action of heat, for instance at temperatures above 200° C. The preferred material for use in the process of the present invention is produced in a finely divided form by passing titanium tetrachloride vapour and hydrogen through a silent electric discharge. The reduction can be carried out under a wide range of temperature, for instance between 0 and 100° C. Preferably the reaction is carried out between 10 and 40° C. for instance at room temperature. Any form of silent electric discharge can be used. Such discharges are well known, for instance, in connection with the production of ozone from oxygen and consequently apparatus employed for the production of metastable titanium trichloride can be generally similar to known ozonisers. The hydrogen used for the reduction should be free from oxygen.

The process of the present invention is carried out using similar techniques to those used for the polymerisation of α-olefins when employing a "Ziegler" polymerisation system. The molar proportion of the reducing component to the metastable titanium trichloride can be varied widely but is generally about one half of the molar proportion of reducing component to other compounds of the appropriate metal which has hitherto been employed in the preparation of similar "Ziegler" catalyst systems for the polymerisation of α-olefins. This is a particular advantage of the present invention because it allows effective catalyst systems to be prepared from relatively smaller amounts of the reducing component as compared with the quantities required in previous catalyst systems using, for example, titanium tetrachloride.

Most suitably the metastable titanium trichloride and the reducing component of the catalyst system are dispersed throughout an inert liquid vehicle thus allowing the two components of the catalyst system to inter-act. The inert liquid vehicle is preferably a solvent for the α-olefin to be polymerised and for the reducing component of the catalyst system. The preferred liquid vehicles are aliphatic, cycloaliphatic and fully hydrogenated aromatic hydrocarbons such as pentane, hexane, cyclohexane, and decahydronaphthalene. The higher paraffins, aromatic hydrocarbons such as benzene and xylene, halogenated aromatic hydrocarbons such as orthodichlorobenzene, partially hydrogenated aromatic hydrocarbons such as tetrahydronaphthalene and chlorinated naphthalene and mixtures thereof can also be employed. Fully saturated compounds are preferred. The quantity of liquid vehicle employed may be varied considerably and should be such that the final recovery of the product is facilitated. When the α-olefin to be polymerised is a liquid under the conditions of the polymerisation it may be unnecesary to employ a liquid vehicle, but it is usually advantageous to do so.

The process of the present invention can readily be brought about by mixing the two components forming the catalyst system with an inert liquid vehicle in a suitable vessel and then allowing the α-olefin to enter the vessel. When the olefin is a gas under the polymerisation conditions, it is often most suitable to pass it directly through the vehicle containing the catalyst system. An alternative procedure, which is particularly suitable for the polymerisation of gaseous α-olefins, is to mix the components of the catalyst system in the presence of the olefin. In such a case the reducing component or the metastable titanium trichloride is mixed with a suitable liquid vehicle, for instance one of those mentioned above, and the liquid mixture is saturated with the gaseous α-olefin. The other component of the catalyst system is then added when it will be found that rapid polymerisation takes place and further quantities of the α-olefin may be passed into the reaction mixture and polymerised.

The preparation of the catalyst system by mixing its two essential components and the subsequent polymerisation reaction should preferably be carried out in the absence of molecular oxygen, carbon dioxide and water. Most suitably all reactions are carried out in an atmosphere of an inert gas, for example, nitrogen or argon, or when a gaseous olefin is being polymerised, in an atmosphere of the olefin itself. The catalyst systems or their components are destroyed by reaction with oxygen, carbon dioxide or water, and, consequently, if any of these substances are present in excess little or no polymerisation will take place. Small quantities of oxygen or water are removed by reaction with part of the catalyst system or its components and any undestroyed catalyst left after this reaction initiates polymerisation in the usual way.

The polymerisation of α-olefins according to the present invention is preferably carried out at moderately elevated temperatures and, when a gaseous olefin is to be polymerized, at atmospheric or moderately elevated pressures. For different polymerisation systems the most suitable temperature to employ to give a convenient polymerisation rate will vary and with gaseous olefins depends in part on the pressure in the system. It is preferred to carry out the polymerisation at a temperature in the range 40 to 150° C. for instance at a temperature of about 70° C. and for gaseous olefins the pressure in the system is preferably initially in the range 50 to 500 pounds per square inch gauge (p.s.i.g.).

The polyolefin produced by the present invention is recovered from the reaction mixture and worked into a final form by any convenient process. It is advantageous to include a mineral acid washing stage in the working up in order to remove metallic contaminants.

The process may be carried out batchwise or continuously and by its use high yields of high grade α-olefin polymers and copolymers can be produced.

A particular advantage of the process is that the rate of polymerisation and the yield of polymer or copolymer from a given weight of catalyst components are improved as compared with the results obtained in a similar process using the same reducing component in the catalyst system but a different compound of a metal occurring in groups IVa to VIa of the periodic table, for instance, stable titanium trichloride. A further advantage of the present invention is that high yields of polymer are obtained from a given weight of reducing component.

The following examples illustrate specific examples of the process of the present invention. The parts by weight (p.b.w.) bear the same relationship to the parts by volume (p.b.v.) as do grams to millilitres.

*Example 1*

About 0.3 p.b.w. of brown metastable titanium trichloride, prepared by passing titanium tetrachloride and hydrogen through a silent electric discharge at room temperature, and 250 p.b.v. of dry petroleum ether (100–120° C. fraction) were added, in an atmosphere of oxygen-free nitrogen, to a bolt-necked flask fitted with a central stirrer and three side arms. Carefully purified ethylene was then admitted, at atmospheric pressure, via a bubble tube held in one side arm, the excess ethylene being passed out of a second arm. With continuous stirring 1.9 p.b.w. of diethyl aluminum iodide in 50 p.b.v. of petroleum ether was then added from a separating funnel through the third side arm. Polymerisation commenced almost immediately and the temperature rose to 70° C. in 25 minutes. A further 200 p.b.v. of petroleum ether was then added and the polymerisation continued for a total reaction time of 175 minutes at 70° C.

The ethylene stream was then stopped and the flask flushed with nitrogen before the reaction mixture was treated with ethanol and ethanolic hydrochloric acid to give a pure white suspension of polyethylene. The product was removed by filtration and dried, giving a good yield of high molecular weight linear polyethylene which could be pressed at 160° C. to give a tough, flexible, transparent film.

The polyethylene obtained was found to have a tensile strength of 4,880 lbs. per sq. in. and an impact strength greater than $100 \times 10^6$ ergs. per sq. cm.

A similar experiment carried out using the stable, violet form of titanium trichloride produced considerably less polymer under the same reaction conditions.

Similar improvements are obtained when the diethyl aluminium iodide is replaced by any of the reducing components specifically mentioned in the specification.

Examples 2-8

A series of polymerisations of propylene were carried out using a catalyst system formed from triethyl aluminium and metastable titanium trichloride prepared by passing titanium tetrachloride and hydrogen through a silent electric discharge at room temperature. The polymerisations were carried out in a steel reactor fitted with a stirrer and immersed in a thermostatically controlled oil bath. The vessel was evacuated and the titanium trichloride introduced as a suspension in petroleum ether while maintaining a flow of nitrogen through the apparatus. The triethyl aluminium was then added together with further quantities of petroleum ether. Propylene was introduced to a pressure of 25 p.s.i.g. and the polymerisation was allowed to continue for five hours. Further reaction conditions and the results obtained are shown in the following table. The yield of polymer is expressed in terms of the weight of titanium trichloride taken:

| Example No. | Molar ratio, Ti/Al | Conc of TiCl₃, moles/litre | Bath Temp., °C. | Yield Polymer in parts by weight per part of TiCl₃ taken |
|---|---|---|---|---|
| 2 | 1:1.9 | 0.0065 | 40 | 119 |
| 3 | 1:2.0 | ---do--- | ---do--- | 110 |
| 4 | 1:1.0 | ---do--- | ---do--- | 86 |
| 5 | 1:4.4 | ---do--- | ---do--- | 152 |
| 6 | 1:2.1 | 0.0035 | ---do--- | 157 |
| 7 | 1:2.7 | ---do--- | ---do--- | 156 |
| 8 | 1:2.6 | 0.0065 | 80 | 108 |

In strictly comparable procedures in which titanium tetrachloride was used in place of the metastable titanium trichloride the maximum yield of polymer was 54 times the weight of titanium tetrachloride taken and the average yield over 13 experiments was 24 times the weight of titanium tetrachloride. The propylene and the petroleum ether used was of the same purity in all cases.

Substantially similar improvements in the rate of polymerisation by using brown, metastable titanium trichloride in place of titanium tetrachloride are obtained in catalyst systems for the polymerisation of α-olefins in which the reducing component is replaced by any of those mentioned in the specification e.g., tripropyl aluminium, diethyl aluminium chloride, di-isobutyl aluminium chloride, di-butyl aluminium fluoride, triphenyl aluminium, dimethyl aluminium bromide and dimethyl zinc.

Example 9

The same polymerisation technique as that described in Examples 2 to 8 was employed but the catalyst system was prepared by mixing 1 p.b.w. of lithium borohydride and 1.82 p.b.w. of metastable titanium trichloride in 600 p.b.v. petroleum ether and heating the mixture to 106° C. for 15 minutes. The oil bath was then cooled to 80° C. and propylene added to a pressure of 25 p.s.i.g. The polymerisation was continued for five hours to give a good yield of polypropylene.

Example 10

1.34 p.b.w. of brown titanium trichloride and 2.04 p.b.w. of diethyl aluminium chloride were mixed with 200 p.b.v. of dry petroleum ether, (110 to 120° C. fraction) in a stainless steel reaction vessel fitted with a stirrer. 66 p.b.w. butene-1 and 300 p.b.v. petroleum ether were added and the temperature of the reaction mixture raised to 105° C. After three hours, the polymerisation was stopped and alcohol added to the reaction mixture. The polymer was washed with methanolic hydrochloric acid and then with pure methanol and dried in an oven. The white, solid polymer so obtained had a crystalline melting point of 113° C. measured by a dilatometric method, and a specific viscosity of 0.72 measured at a concentration of 0.667% w./v. in tetralin at 125° C. The polymer was extracted with hot acetone and the residue (88% of the original polymer) had a specific viscosity of 0.89. Further extraction with hot ether left a residue corresponding to 52% of the original material. This had a specific viscosity (measured as above) of 1.32, a tensile strength of 3270 p.s.i.g. and a crystalline melting point of 118° C.

Example 11

An ethylene polymerisation at atmospheric pressure was carried out in a similar manner to that described in Example 1, employing 1.82 p.b.w. brown, metastable titanium trichloride and 1.44 p.b.w. of diethyl aluminium chloride in 500 p.b.v. of dry petroleum ether (boiling range 100 to 120° C.). The temperature was held at 85° C. and the total polymerisation time was 250 minutes. At the end of this period the catalyst showed no signs of decreased activity.

The total yield of the polymer during the above period was 113.2 p.b.w. This polyethylene could be pressed at 160° C. to give very tough films and sheets.

I claim:

1. A process for the polymerisation of an α-olefin which comprises contacting the α-olefin with a catalyst system formed by mixing a reducing component of a "Ziegler" polymerisation system, which is a compound of a non-transition metal occurring in the first four groups of the periodic table, with preformed, metastable titanium trichloride.

2. A process as claimed in claim 1, wherein the α-olefin is ethylene.

3. A process as claimed in claim 1, wherein the α-olefin is propylene.

4. A process as claimed in claim 1, wherein the metastable titanium trichloride is formed by passing hydrogen and titanium tetrachloride through a silent electric discharge at a temperature between 0 and 100° C.

5. A process as claimed in claim 1, wherein the reducing component is an organo-metallic compound.

6. A process as claimed in claim 5, wherein the organo-metallic compound is selected from the group consisting of aluminium trialkyls and dialkyl aluminium halides.

7. A process as claimed in claim 1, wherein the polymerisation reaction is carried out in an inert liquid vehicle which is a solvent for the α-olefin and for the reducing component.

8. A process as claimed in claim 1, wherein the polymerisation is carried out at a temperature in the range 40 to 150° C.

9. A process as claimed in claim 1, wherein the reducing component is aluminium triethyl.

10. A process as claimed in claim 1, wherein the reducing component is diethyl aluminium chloride.

11. A process for the polymerization of an α-olefin represented by the formula R—CH=CH₂, wherein R is a member selected from the group consisting of hydrogen, alkyl, cycloalkyl and aryl, which comprises contacting the α-olefin under polymerization conditions with a catalyst system formed by mixing (a) a compound of a non-transitional metal occurring in the first four groups of the periodic table, which compound is capable of forming a catalyst system for the polymerization of α-olefins, with (b) preformed metastable titanium trichloride.

12. A process according to claim 11 wherein R is alkyl.

13. A process according to claim 11 wherein R is cycloalkyl.

14. A process according to claim 11 wherein R is aryl.

15. A process for the polymerization of an α-olefin which comprises contacting the α-olefin under polymerization conditions with a catalyst system consisting essentially of the product formed by mixing (a) a compound of a non-transitional metal occurring in the first four groups of the periodic table, which compound is capable of forming a catalyst system for the polymerization of α-olefins, with (b) preformed metastable titanium trichloride.

16. A catalyst system for α-olefin polymerization which consists essentially of the product formed by mixing (1) a reducing component of a "Ziegler" polymerization system, which is a compound of a non-transition metal occurring in the first four groups of the periodic table, with (2) preformed, metastable titanium trichloride.

References Cited in the file of this patent

UNITED STATES PATENTS

| | | |
|---|---|---|
| 2,721,189 | Anderson et al. | Oct. 18, 1955 |
| 2,827,447 | Nowlin et al. | Mar. 18, 1958 |
| 2,832,759 | Nowlin et al. | Apr. 29, 1958 |
| 2,893,984 | Seelbach et al. | July 7, 1959 |
| 2,905,645 | Anderson et al. | Sept. 22, 1959 |

FOREIGN PATENTS

| | | |
|---|---|---|
| 526,101 | Italy | May 14, 1955 |
| 533,362 | Belgium | May 16, 1955 |
| 538,782 | Belgium | Dec. 6, 1955 |

OTHER REFERENCES

La Chimica e l'Industria, vol. 38 (February 1956), pp. 124–127. (Article by Natta et al.)

"Chemical Reviews," vol 58, No. 3, June 1958, pages 541–580, pages 565–567.